(No Model.)
C. WESTBROOK.
AUTOMATIC CHEMICAL TELEGRAPH.
No. 313,791. Patented Mar. 10, 1885.
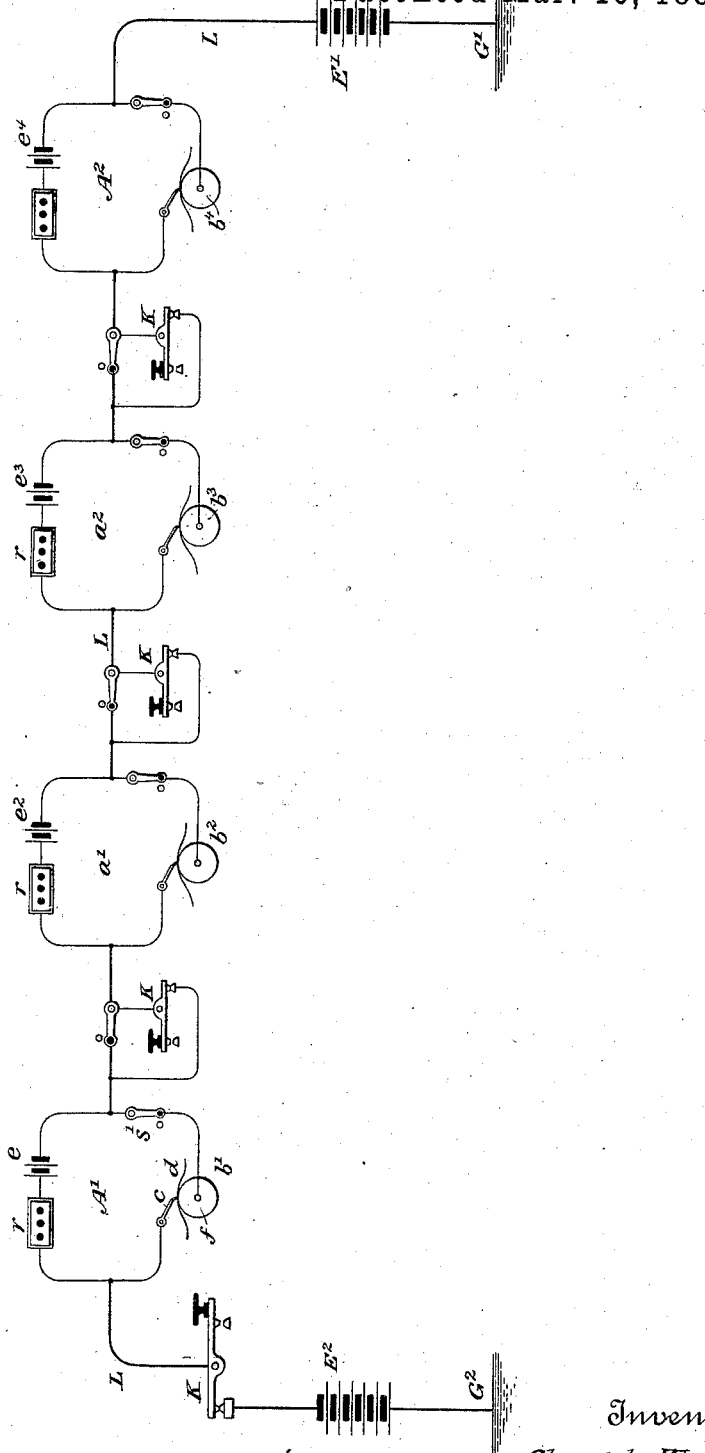
Witnesses
Wm. A. Skinkle
Jos. S. Latimer
Inventor
Cherrick Westbrook
By his Attorneys
Pope & Edgecomb

UNITED STATES PATENT OFFICE.

CHERRICK WESTBROOK, OF HARRISBURG, PENNSYLVANIA.

AUTOMATIC CHEMICAL TELEGRAPH.

SPECIFICATION forming part of Letters Patent No. 313,791, dated March 10, 1885.

Application filed July 18, 1884. (No model.)

*To all whom it may concern:*

Be it known that I, CHERRICK WESTBROOK, a citizen of the United States, residing in Harrisburg, in the county of Dauphin and State of Pennsylvania, have invented certain new and useful Improvements in Automatic Chemical Telegraphs, of which the following is a specification.

My invention relates to the class of telegraphic apparatus employed for transmitting and receiving messages through the instrumentality of receiving-styluses, which act upon chemically-prepared paper when traversed by electric currents in the proper manner. Such organizations are usually termed "automatic chemical telegraphs."

The object of the invention is to provide means for transmitting messages from one station to another through the agency of electric currents acting upon chemical paper, and to render possible to record such messages at any number of intervening stations whenever it is so desired; and, further, to so arrange the batteries and circuits as to free the main line from the disturbing effects of static charges and discharges.

It has been customary to so organize the apparatus employed in chemical telegraphy that the currents employed for recording will, upon traversing the chemically-prepared paper, pass to the earth. The resistance offered by the paper and recording-stylus is sufficient to so far reduce the strength of the currents employed that it is impracticable to place two or more receiving-instruments in circuit in series, and for this reason but a single receiving-instrument is usually placed in such a telegraphic circuit.

My invention consists in placing at the respective terminals of a telegraphic main line two batteries, and, if desired, intermediate main batteries, which are connected with the main line in series, and in equipping the main line, both at the transmitting and receiving stations and at the intermediate stations, with interposed local circuits formed of two multiple-arc branches of the main line.

In one of the branches of the local circuit at each station is placed a local battery, in series with the main-line batteries, and in the other branch a receiving-instrument is placed. The latter is so connected in circuit that the currents from the main-line batteries are in the wrong direction for operating the recorder. Currents, however, from the local battery will serve to operate the local receiving-instruments when not opposed by the main-line batteries. Normally, however, the currents flowing through the main line from the main or terminal batteries counteract the effects of the local batteries and prevent the corresponding receiving-instruments from operating. An interruption, however, of the main-line circuit, whether it be made at one or the other of the terminals thereof, or at any intermediate point on the line, will cause each of the receiving-instruments to be operated by the corresponding local batteries.

The accompanying drawing is a diagram illustrating the general organization of circuits employed in carrying out my invention.

Referring to the drawing, L represents a main line, and $E'$ and $E^2$ two main-line batteries included in circuit therewith, and located at the respective terminals thereof. One of the batteries, $E'$, has its positive pole connected with the main line and its negative pole with the earth at $G'$. The second battery, $E^2$, has its positive pole connected with the earth at $G^2$ and its negative pole with the main line. The two batteries are thus connected in series.

At the terminal stations $A'$ and $A^2$, respectively, as well as at the intermediate stations, $a'$ and $a^2$, there are placed chemical receiving-instruments $b'$ $b^2$, &c. The receiving-instruments $b$ are respectively included in what may be considered local branch circuits of the main line. These instruments each consist of a recording-stylus, $c$, which is designed to rest upon chemically-prepared paper $d$, which is passed over a roller, $f$, in a manner well understood. The circuit-connections, however, of these recording-styluses are such that the currents from the batteries E, which normally traverse the main line, will not cause the recording-pens to produce impressions upon chemically-prepared paper, for the reason that they traverse the same in the wrong direction. In one of these multiple-arc branches forming the local circuit is placed a local battery, $e$. In the other branch a receiving-instrument is placed. The connections of each of these batteries are such that they tend to oppose the currents proceeding from the batteries E in the conductors, including the receiving-instruments. The strength of the current proceeding from the two batteries E is sufficient, however, to neutralize the effects of the entire series of batteries e in the branch conductors, and to thereby prevent the same from causing the receiving-styluses to record. When, however, the main-line circuit is interrupted at any point, the local batteries will be allowed to act, each having its circuit complete, from the positive pole through the recording-stylus, the chemically-prepared paper, and the recording-roller of the corresponding receiving-instrument, back to its negative pole, and each instrument will therefore record an impression of length dependent upon the duration of the interruption of the main-line circuit.

In practice the proportions of the batteries and resistances may be approximately as follows: Considering the main line to offer a total resistance of ten thousand ohms, then the electro-motive force of the main-line battery may be one thousand volts, the local batteries having each an electro-motive force of, say, ten volts. Suitable circuit-interrupting keys or transmitters, K, are placed at any required points in the main-line circuit, and any one of these keys may be employed for transmitting to all of the receiving-instruments.

In each of the local circuits there may be placed a switch, $s'$, which is adapted to complete the circuit-connections around the corresponding receiving-instruments.

In practice it may not always be essential to employ the battery E at both terminals of the main line; but I usually prefer such an organization for the purpose of equalizing the main-line charge, and to as great an extent as possible removing the detrimental effects of the static charge and discharge. Suitable artificial resistance, $r$, may be employed in the circuit with the batteries $e$, for modifying the effects of the same.

I claim as my invention—

1. The combination, substantially as hereinbefore set forth, with a telegraphic main line, and means, substantially such as described, for causing an electric current to normally traverse the same, of a series of chemical receiving-instruments included in the circuit thereof, the connections of said receiving-instruments being such that main-line currents traverse the same in the opposite directions from that required to produce impressions, a branch circuit through each of said receiving-instruments, and a local battery included in each of said branch circuits, the current from said local battery through the respective receiving-instruments being in the direction opposite to that of the currents normally traversing the main line.

2. The combination, substantially as hereinbefore set forth, with a telegraphic main line and one or more main-line batteries for producing currents in a given direction, of a series of chemical receiving-instruments responding to currents in the direction opposite to that of the currents normally traversing the main line, a series of local batteries connected through said receiving-instruments, respectively, the connections of said local batteries being opposed to those of the first-named batteries, and means, substantially such as described, for interrupting the circuit-connections of the main line.

3. The combination, substantially as hereinbefore set forth, with a telegraphic main line and two batteries located at the receiving-terminals thereof, which batteries have opposite poles presented to the main line, of a series of local batteries included in branch circuits of the main line, a series of chemical receiving-instruments included in corresponding branch circuits, respectively, the connections of said receiving-instruments being such that they will respond to the currents from the corresponding local batteries, respectively, when not opposed by main-line currents, and the currents from said local batteries being opposed in said receiving-instruments to the currents from said main-line batteries, and means, substantially such as described, for interrupting the circuit-connections of the main-line batteries.

In testimony whereof I have hereunto subscribed my name this 14th day of July, A. D. 1884.

CHERRICK WESTBROOK.

Witnesses:
   EDWD. MOBERG COOPER,
   SAMUEL W. FLEMING.